(12) United States Patent
Stieger

(10) Patent No.: US 11,038,390 B2
(45) Date of Patent: Jun. 15, 2021

(54) ELECTRICAL MACHINE APPARATUS HAVING A CONDUIT WITH A PARTICULAR ARRANGEMENT FOR AN INLET AND OUTLET

(71) Applicant: ROLLS-ROYCE plc, London (GB)

(72) Inventor: Rory D. Stieger, Derby (GB)

(73) Assignee: ROLLS-ROYCE PLC, London (GB)

( * ) Notice: Subject to any disclaimer, the term of this patent is extended or adjusted under 35 U.S.C. 154(b) by 463 days.

(21) Appl. No.: 16/035,921

(22) Filed: Jul. 16, 2018

(65) Prior Publication Data

US 2019/0052139 A1    Feb. 14, 2019

(30) Foreign Application Priority Data

Jul. 27, 2017    (GB) ..................... 1712113

(51) Int. Cl.
| | |
|---|---|
| *H02K 1/32* | (2006.01) |
| *H02K 9/20* | (2006.01) |
| *F01D 15/10* | (2006.01) |
| *H02K 7/18* | (2006.01) |

(52) U.S. Cl.
CPC .............. *H02K 1/32* (2013.01); *F01D 15/10* (2013.01); *H02K 7/1823* (2013.01); *H02K 9/20* (2013.01); *H02K 2213/03* (2013.01)

(58) Field of Classification Search
CPC ........ F01D 15/10; H02K 1/32; H02K 7/1823; H02K 9/19; H02K 9/197; H02K 9/20; H02K 9/22; H02K 2213/03
USPC ....... 310/52, 54, 55, 58, 59, 60 A, 60 R, 61, 310/64
See application file for complete search history.

(56) References Cited

U.S. PATENT DOCUMENTS

| | | | |
|---|---|---|---|
| 3,765,480 A | 10/1973 | Fries | |
| 4,208,598 A | 6/1980 | Popov et al. | |
| 4,289,985 A | 9/1981 | Popov et al. | |
| 2013/0038151 A1* | 2/2013 | Ohashi | H02K 5/1737 310/59 |
| 2013/0160450 A1* | 6/2013 | Cogswell | F01K 25/08 60/657 |
| 2014/0265667 A1* | 9/2014 | Boxberg | H02K 1/32 310/59 |
| 2014/0368064 A1 | 12/2014 | Fedoseyev et al. | |
| 2017/0214294 A1 | 7/2017 | Menon et al. | |

(Continued)

FOREIGN PATENT DOCUMENTS

| | | |
|---|---|---|
| CN | 206349829 | 7/2017 |
| SU | 1173492 | 8/1985 |
| SU | 1310954 | 5/1987 |

OTHER PUBLICATIONS

Great Britain Search Report dated Jan. 21, 2018, issued in GB Patent Application No. 1712113.8.

*Primary Examiner* — Tulsidas C Patel
*Assistant Examiner* — Rashad H Johnson
(74) *Attorney, Agent, or Firm* — Brinks Gilson & Lione

(57) ABSTRACT

Electrical machine apparatus comprising: a rotor having an axis of rotation and defining a cavity therein; and a conduit positioned within the cavity of the rotor, the conduit comprising an inlet arranged to receive a fluid and an outlet arranged to exhaust the fluid, the inlet having a first radial distance from the axis of rotation and the outlet having a second radial distance from the axis of rotation, the first radial distance being greater than the second radial distance.

11 Claims, 5 Drawing Sheets

(56) References Cited

U.S. PATENT DOCUMENTS

2019/0260259 A1\* 8/2019 Goldstein ................ H02K 9/00
2020/0028395 A1\* 1/2020 Hashimoto ............ B60K 11/02

\* cited by examiner

ELECTRICAL MACHINE APPARATUS HAVING A CONDUIT WITH A PARTICULAR ARRANGEMENT FOR AN INLET AND OUTLET

CROSS-REFERENCE TO RELATED APPLICATIONS

This specification is based upon and claims the benefit of priority from UK Patent Application Number 1712113.8 filed on 27 Jul. 2017, the entire contents of which are incorporated herein by reference.

BACKGROUND

Technical Field

The present disclosure concerns electrical machine apparatus.

Description of the Related Art

Electrical machines, such as generators and motors, may include a stator, a rotor, a magnet arrangement, and an electrical conductor (often referred to as 'windings'). In some examples, the magnet arrangement may be permanent magnets that are mounted on the rotor and the electrical conductor may be mounted on the stator. Where such an electrical machine operates as a generator, the rotor may be rotated and the moving magnetic field generated by the magnet arrangement induces a current in the electrical conductor to provide an electrical output from the electrical machine. Where such an electrical machine operates as a motor, electricity may be supplied to the electrical conductor to generate a magnetic field that attracts/repels the magnet arrangement and thus causes the rotor to rotate. The magnet arrangement mounted on the rotor may generate thermal energy during operation that may be detrimental to the operation of the electrical machine.

SUMMARY

According to a first aspect there is provided electrical machine apparatus comprising: a rotor having an axis of rotation and defining a cavity therein; a conduit positioned within the cavity of the rotor, the conduit comprising an inlet arranged to receive a fluid and an outlet arranged to exhaust the fluid, the inlet having a first radial distance from the axis of rotation and the outlet having a second radial distance from the axis of rotation, the first radial distance being greater than the second radial distance.

The rotor may include a first portion that extends parallel to the axis of rotation. The conduit may be coupled to the first portion for receiving thermal energy from the first portion via thermal conduction.

The rotor may have a second portion defining a first end of the rotor, and a third portion defining a second end of the rotor. The conduit may extend between the first end of the rotor and the second end of the rotor.

The inlet may be positioned adjacent to the first end of the rotor. The outlet may be positioned adjacent to the second end of the rotor.

The rotor may be arranged to rotate in a first circumferential direction. The conduit may have an orientation having a circumferential component. The circumferential component may be opposite in direction to the first circumferential direction.

The electrical machine apparatus may further comprise a first fluid within the cavity of the rotor. The first fluid may have a boiling point that is lower than an operating temperature of the rotor.

The electrical machine apparatus may further comprise: a shaft defining a cavity therein; and a second fluid within the cavity of the shaft for cooling the shaft to a temperature below the boiling point of the first fluid.

The electrical machine apparatus may further comprise a further conduit positioned within the cavity of the rotor. The further conduit may comprise an inlet arranged to receive a fluid and an outlet arranged to exhaust the fluid. The inlet may have a third radial distance from the axis of rotation and the outlet may have a fourth radial distance from the axis of rotation. The third radial distance may be greater than the fourth radial distance.

The third radial distance may be the same as, or different to the first radial distance, and the fourth radial distance may be the same as, or different to the second radial distance.

The conduit may be positioned at a first circumferential position within the cavity of the rotor. The further conduit may be positioned at a second circumferential position within the cavity of the rotor. The second circumferential position may be different to the first circumferential position.

According to a second aspect there is provided a gas turbine engine comprising the electrical machine apparatus as described in any of the preceding paragraphs.

According to a third aspect there is provided a propulsion system comprising a gas turbine engine; electrical machine apparatus as described in any of the preceding paragraphs; and a propulsive fan arranged to receive torque from the electrical machine apparatus.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
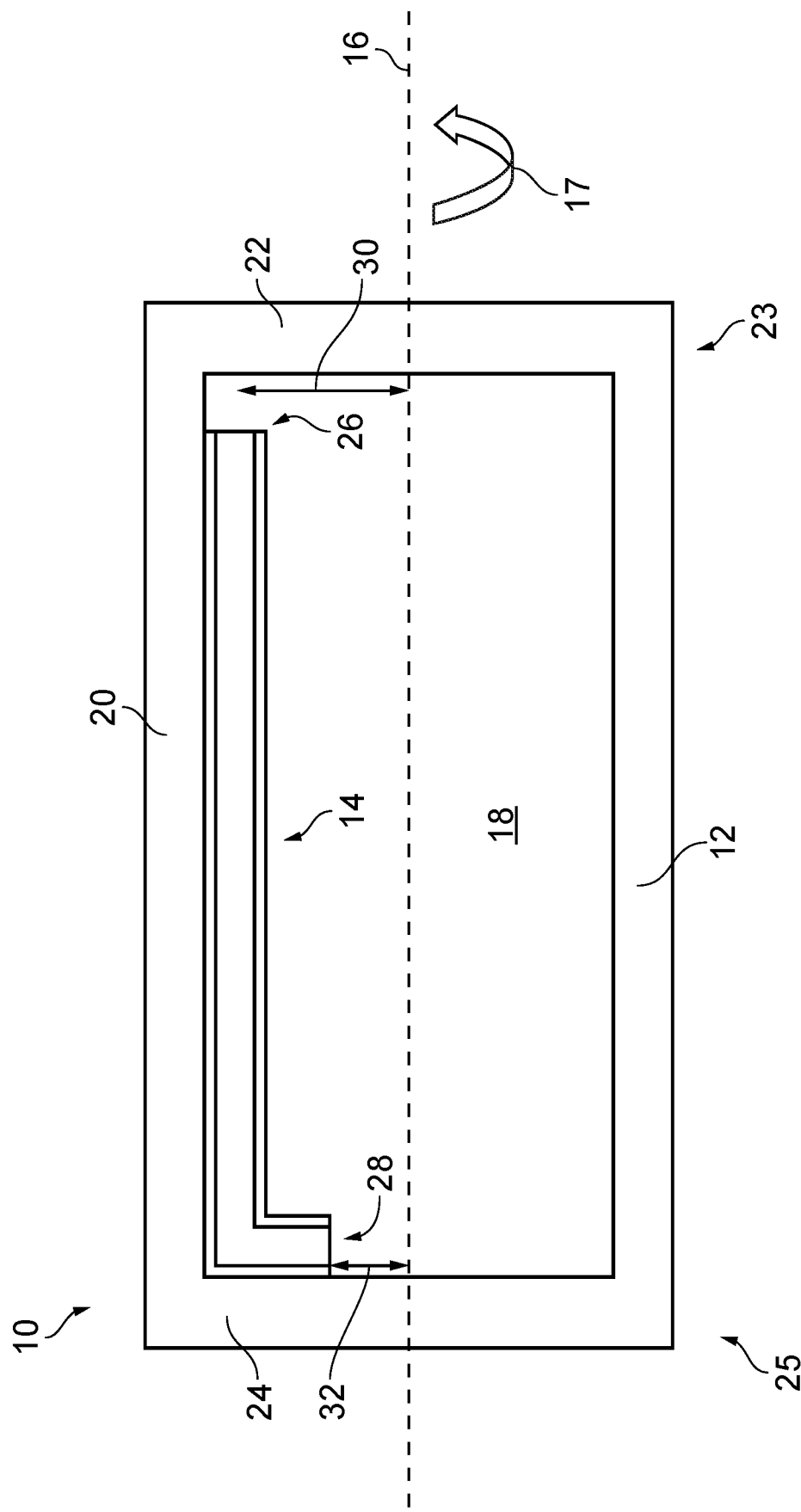
FIG. 1 illustrates a schematic cross sectional side view of electrical machine apparatus according to a first example.

FIG. 1 illustrates an electrical machine apparatus 10 according to a first example. The electrical machine apparatus 10 includes a rotor 12 and a conduit 14. The electrical machine apparatus 10 may be configured to operate as an electrical generator or as an electrical motor.

In some examples, the electrical machine apparatus 10 may be a module of an electrical machine. As used herein, the wording 'module' refers to a device or apparatus where one or more features are included at a later time and, possibly, by another manufacturer or by an end user. For example, where the electrical machine apparatus 10 is a module of an electrical machine, the electrical machine apparatus 10 may only include the rotor 12 and the conduit 14, and the remaining features of the electrical machine (such as a magnet arrangement, a stator, and electrical windings for example) may be added by another manufacturer, or by an end user.

The rotor 12 may comprise any suitable ferromagnetic material (such as iron, nickel, or cobalt for example) and may have any suitable shape (for example, the rotor 12 may have a circular cross sectional shape or a polygonal cross sectional shape). The rotor 12 has an axis 16 and is arranged to rotate about the axis 16 in a circumferential direction (for example, in the direction of arrow 17). The rotor 12 defines a cavity 18 therein and includes a first portion 20 that extends parallel to the axis 16, a second portion 22 that defines a first end 23 of the rotor 12, and a third portion 24 that defines a second end of 25. The cavity 18 may be sealed so that in operation, a fluid may be contained within the cavity 18.

The conduit 14 is positioned within the cavity 18 of the rotor 12 and may also be referred to as a pipe. The conduit 14 comprises an inlet 26 that is arranged to receive a fluid and an outlet 28 that is arranged to exhaust the fluid. The inlet 26 has a first radial distance 30 from the axis 16 and the outlet 28 has a second radial distance 32 from the axis 16. The first radial distance 30 is greater than the second radial distance 32 (that is, the outlet 28 of the conduit 14 is positioned closer to the axis 16 than the inlet 26 of the conduit 14).

The conduit 14 may extend between the first end 23 of the rotor 12 and the second end 25 of the rotor 12 as illustrated in FIG. 1. The inlet 26 may be positioned adjacent to the first end 23 of the rotor 12, and the outlet 28 may be positioned adjacent to the second end 25 of the rotor 12. In other examples, the conduit 14 may only extend circumferentially around the rotor 12 and the inlet 26 and the outlet 28 may have the same axial position. In further examples, the conduit 14 may extend along the axis 16 and circumferentially around the rotor 12 and thus have a helical shape.

The conduit 14 is L shaped and the inlet 26 is oriented parallel to the axis 16 and the outlet 28 is oriented perpendicular to the axis 16. It should be appreciated that in other examples, the conduit 14 may have a different shape and the inlet 26 and the outlet 28 may have different orientations. For example, both the inlet 26 and the outlet 28 may be oriented perpendicular to the axis 16 and the conduit 14 may consequently be U shaped.

The conduit 14 may be coupled to the first portion 20. For example, the conduit 14 may be directly connected to, and abut, the first portion 20 of the rotor 12. In other examples, the conduit 14 may not be directly connected to the first portion 20 and may instead be coupled to the second portion 22 and to the third portion 24 and define a gap with the first portion 20.

The conduit 14 may be enclosed between the inlet 26 and the outlet 28. For example, the conduit 14 may have a circular, elliptical, or polygonal cross sectional shape between the inlet 26 and the outlet 28. In other examples, the conduit 14 may be open along at least one or more portions between the inlet 26 and the outlet 28. For example, one or more portions of the conduit 14 may have a U shaped cross sectional shape.

Figure 2:
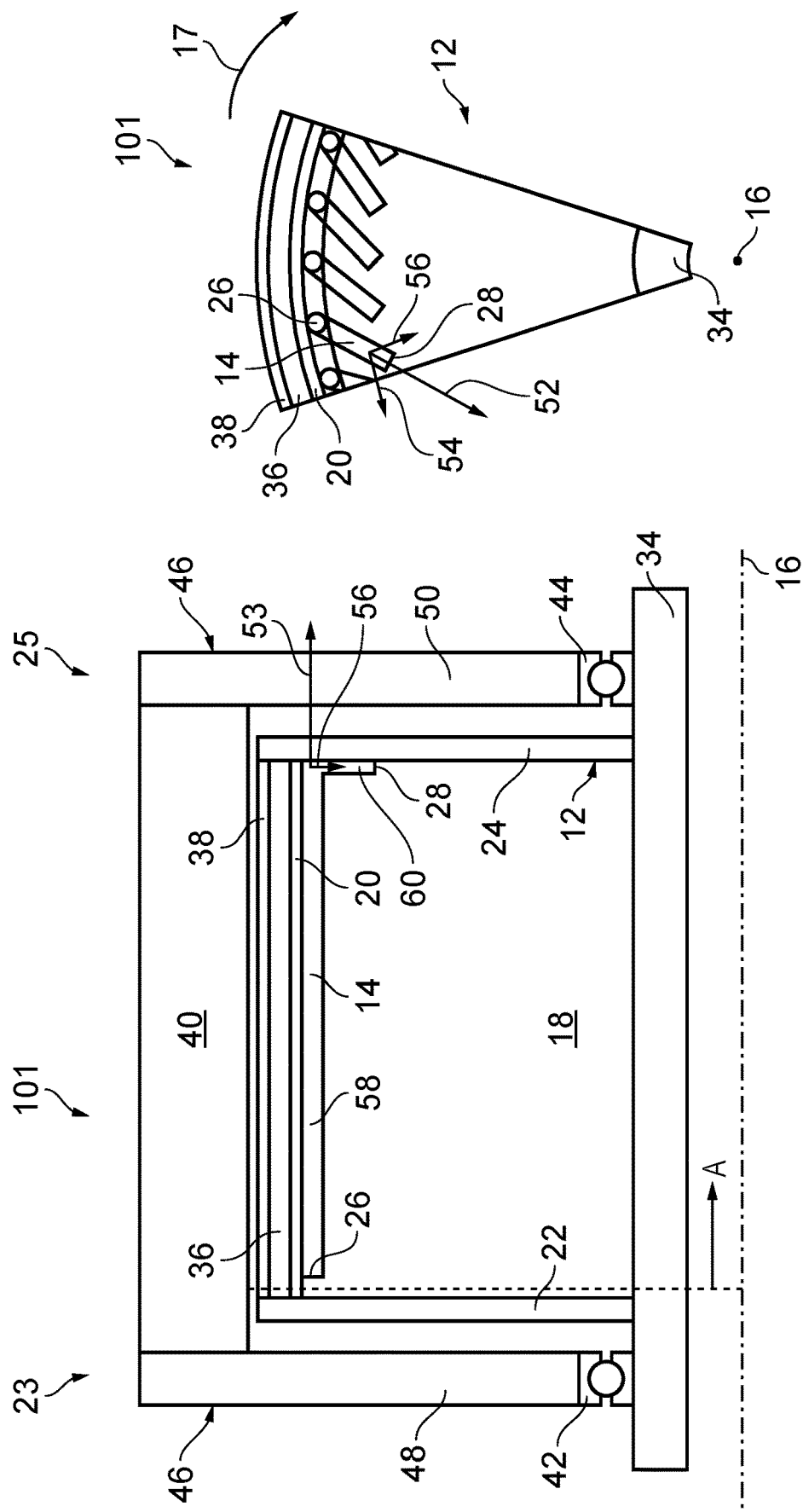
FIG. 2A illustrates a schematic cross sectional side view of electrical machine apparatus according to a second example.
FIG. 2B illustrates a schematic cross sectional front view of the electrical machine apparatus illustrated in FIG. 2A through view A.

FIGS. 2A and 2B illustrate an electrical machine apparatus 101 according to a second example. The electrical machine apparatus 101 is similar to the electrical machine apparatus 10 and where the features are similar, the same reference numerals are used.

The electrical machine apparatus 101 includes a shaft 34, a rotor 12, a magnet arrangement 36, banding 38, a stator 40, a first bearing 42, a second bearing 44, and a casing 46.

The shaft 34 is arranged to rotate about the longitudinal axis 16 in the first circumferential direction 17. The magnet arrangement 36 is mounted on the first portion 20 of the rotor 12 by the banding 38, and the rotor 12 is mounted on the shaft 34. Consequently, the rotor 12, the magnet arrangement 36, and the banding 38 are arranged to rotate about the longitudinal axis 16 in the first circumferential direction 17.

The magnet arrangement 36 may be an arrangement of permanent magnets, or may be an elongate electrical conductor (which may be referred to as 'windings') that is arranged to function as an electromagnet (for wound field or induction), or may comprise a plurality of ferromagnetic laminations (where the electrical machine 101 is a switched reluctance motor).

The casing 46 has a first end member 48 and a second end member 50 that extend perpendicular to the axis 16. The first end member 48 of the casing 46 is mounted on the shaft 34 by the first bearing 42, and the second end member 50 of the casing 46 is mounted on the shaft 34 by the second bearing 44. The casing 46 is thus static relative to the shaft 34. The stator 40 is mounted on the casing 46 between the first end member 48 and the second end member 50 and is also static relative to the shaft 34, the rotor 12 and the magnet arrangement 36. The stator 40 may comprise an arrangement of permanent magnets, or may comprise an elongate electrical conductor (which may be referred to as 'windings') that is configured to function as an electromagnet, or may comprise a plurality of ferromagnetic laminations (where the electrical machine 101 is a switched reluctance motor).

As mentioned in the preceding paragraphs, the rotor 12 is arranged to rotate in a first circumferential direction 17 about the axis 16. The conduit 14 has an orientation 52 having a circumferential component 54 and a radial component 56. The circumferential component 54 is opposite in direction to the first circumferential direction 17. In the example illustrated in FIGS. 2A and 2B, the conduit 14 has a first portion 58 and a second portion 60. The orientation of the first portion 58 only has an axial component 53 (that is, the first portion 58 only extends parallel to the axis 16). The orientation of the second portion 60 only has the circumferential component 54 and the radial component 56.

The electrical machine apparatus 101 includes a plurality of conduits 14 positioned within the cavity 18 of the rotor 12. As illustrated in FIG. 2B, the plurality of conduits 14 may be positioned at different circumferential positions around the axis 16 (that is, the plurality of conduits 14 are arranged in a row around the axis 16). In other examples, the plurality of conduits 14 may be positioned at the same circumferential position as one another, and instead be positioned at different axial positions (that is, the plurality of conduits 14 are arranged in a column). In further examples, the plurality of conduits 14 may be positioned so that the electrical machine apparatus 101 has two or more columns of conduits, and two of more rows of conduits.

Figure 3:
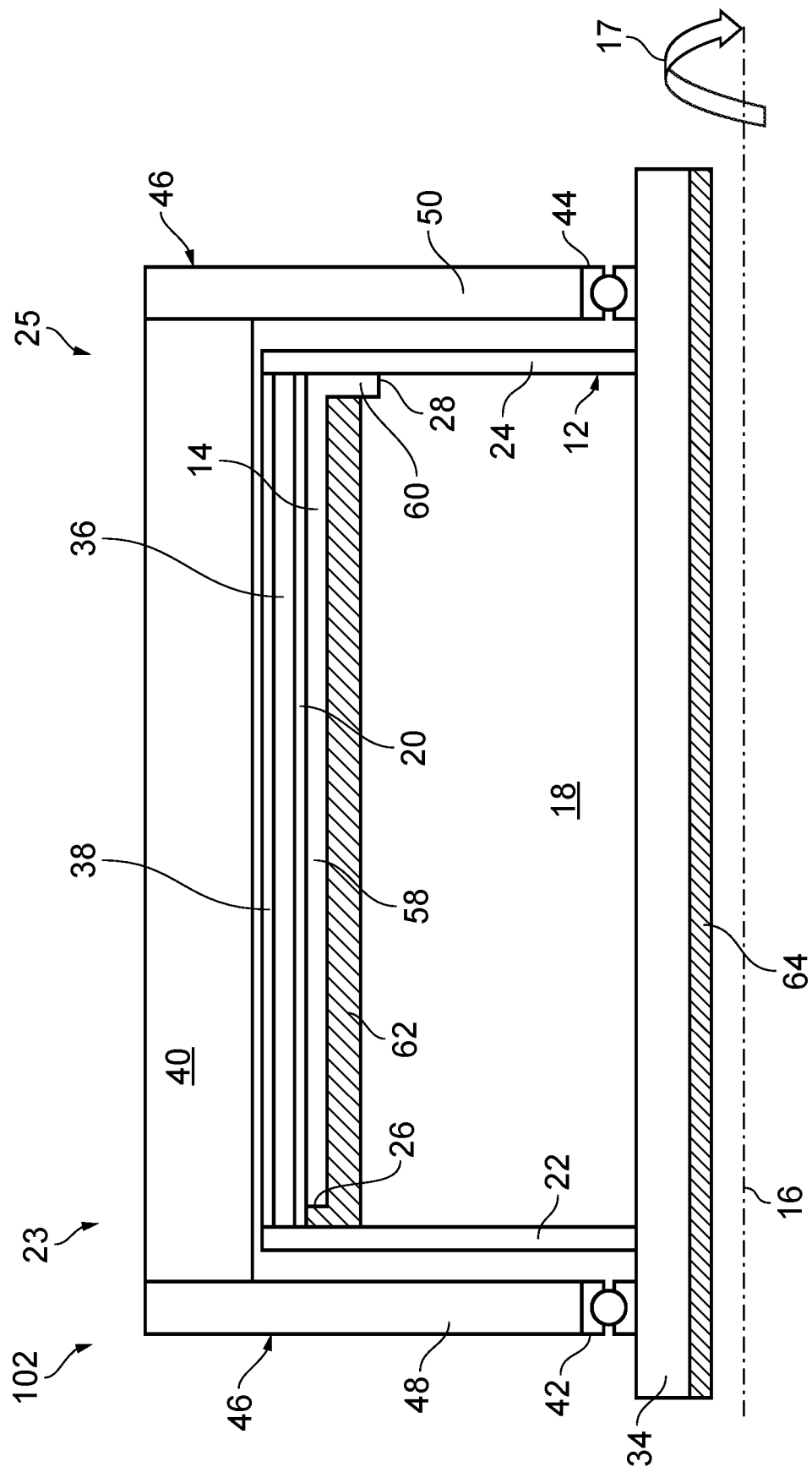
FIG. 3 illustrates a schematic cross sectional side view of the electrical machine apparatus illustrated in FIGS. 2A and 2B in operation.

FIG. 3 illustrates a cross sectional side view of electrical machine apparatus 102 during operation. The electrical machine apparatus 102 is similar to the electrical machine apparatus 101 and where the features are similar, the same reference numerals are used.

The electrical machine apparatus 102 differs from the electrical machine apparatus 101 in that the electrical machine apparatus 102 includes a first fluid 62 within the cavity 18 of the rotor 12; and a second fluid 64 within the shaft 34. The first fluid 62 may be any suitable fluid that has a boiling point that is lower than an operating temperature of the rotor 12. For example, the first fluid 62 may be a refrigerant, a low boiling point fluid, or a hydrofluoroether based heat transfer fluid such as 3M Novec 7500. The second fluid 64 may be any suitable fluid for cooling the shaft 34 to a temperature below the boiling point of the first fluid 62. For example, the second fluid 64 may be fluid in a coolant stream such as air, water, glycol, fuel for a gas turbine engine or oil for a gas turbine engine.

During operation of the electrical machine apparatus 101, the rotor 12 rotates about the axis 16 in the first circumferential direction 17 and thermal energy is generated by the magnet arrangement 36. The thermal energy flows from the magnet arrangement 36 and into the first portion 20 of the rotor 12. The first fluid 62 circulates within the cavity 18 and in the conduit 14 and removes thermal energy from the first portion 20 and the magnet arrangement 36.

In more detail, the rotation of the rotor 12 causes the first fluid 62 (in liquid form) to move radially outwards to the first portion 20 of the rotor 12 and enter the inlet 26 of the conduit 14. As illustrated in FIG. 3, the volume of the first fluid 62 in the cavity 18 (in liquid form) is less than the volume defined between the radial position of the outlet 28 and the first portion 20. Consequently, the inlet 26 is immersed in the first fluid 62 (in liquid form) and the outlet 28 is positioned outside of the first fluid 62 (in liquid form) during rotation of the rotor 12.

The first fluid 62 flows within the conduit 14 towards the outlet 28 and thermal energy is transferred from the rotor 20 to the first fluid 62. Where the conduit 14 is connected to, and abuts the first portion 20, the thermal energy is transferred via thermal conduction. In other examples where the conduit 14 defines a gap with the first portion 20, the thermal energy is transferred via convection by the first fluid 62 in the gap. The transfer of thermal energy to the first fluid 62 in the conduit 14 causes the first fluid 62 in the conduit 14 to boil and change phase from a liquid to a gas. The first fluid 62 (in gas form) is exhausted from the outlet 28 and moves radially inwards towards the shaft 34. The second fluid 64 cools the shaft 34 to a temperature below the boiling point of the first fluid 62 and consequently, the first fluid 62 condenses on the shaft 34 and changes phase from a gas to a liquid. The first fluid 62 (in liquid form) detaches from the shaft 34 and once again moves radially outwards to the first portion 20 of the rotor 12 and enters the inlet 26 of the conduit 14.

The shaft 34 may be arranged so that the temperature of the second fluid 64 is maintained at a temperature below the boiling point of the first fluid 62. For example, the shaft 34 may extend along the axis 16 to a location that is relatively cool and the thermal energy received by the second fluid 64 may be dissipated at that location. By way of another example, the shaft 34 may comprise, or be coupled to, a cooling arrangement that removes thermal heat from the second fluid 64. In one example, a portion of the shaft 34 may be positioned in a cooling air flow. In another example, the shaft 34 may be coupled to one or more heat pipes.

The electrical machine apparatus 10, 101, 102 may be advantageous in that the conduit 14 enables a fluid to circulate within the cavity 18 of the rotor 12 and cool the rotor 12 and the magnet arrangement 36. The removal of thermal energy from the rotor 12 and the magnet arrangement 36 may improve the performance of the electrical machine apparatus 10, 101, 102. Additionally, the circumferential component 54 of the orientation of the conduit 14 may provide additional torque to the rotor 12 during operation and thus improve the performance of the electrical machine apparatus 10, 101, 102.

Figure 4:
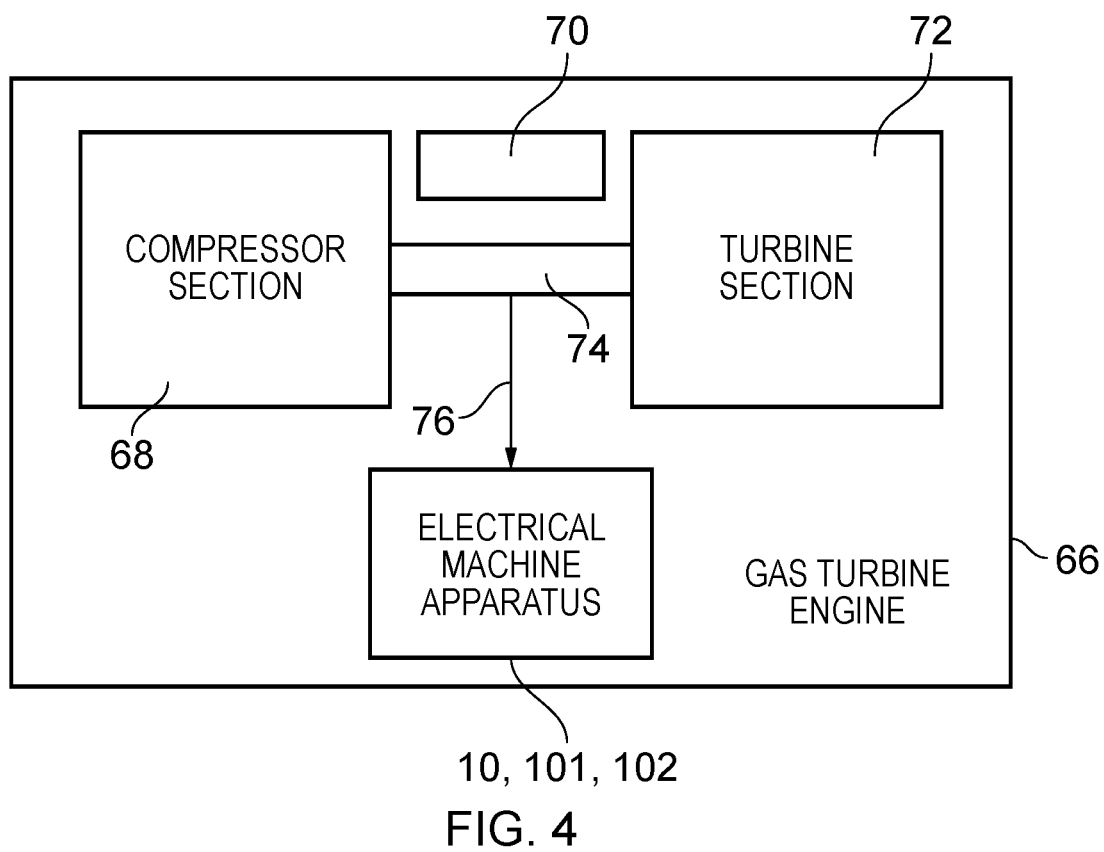
FIG. 4 illustrates a schematic diagram of a gas turbine engine comprising an electrical machine apparatus according to an example.

FIG. 4 illustrates a schematic diagram of a gas turbine engine 66 comprising an electrical machine apparatus 10, 101, 102, a compressor section 68, a combustion section 70, a turbine section 72 and one or more shafts 74. The electrical machine apparatus 10, 101, 102 is coupled to one of the shafts 74 via a drive train 76 and may thus function as an electrical generator. For example, the electrical machine apparatus 10, 101, 102 may be coupled to one of the shafts 74 via an auxiliary gearbox of the gas turbine engine 66. In other examples, the electrical machine apparatus 10, 101, 102 may be directly mounted on one of the shafts 74. For example, the shaft 34 illustrated in FIGS. 2A, 2B, and 3 may be one of the shafts 74.

Figure 5:
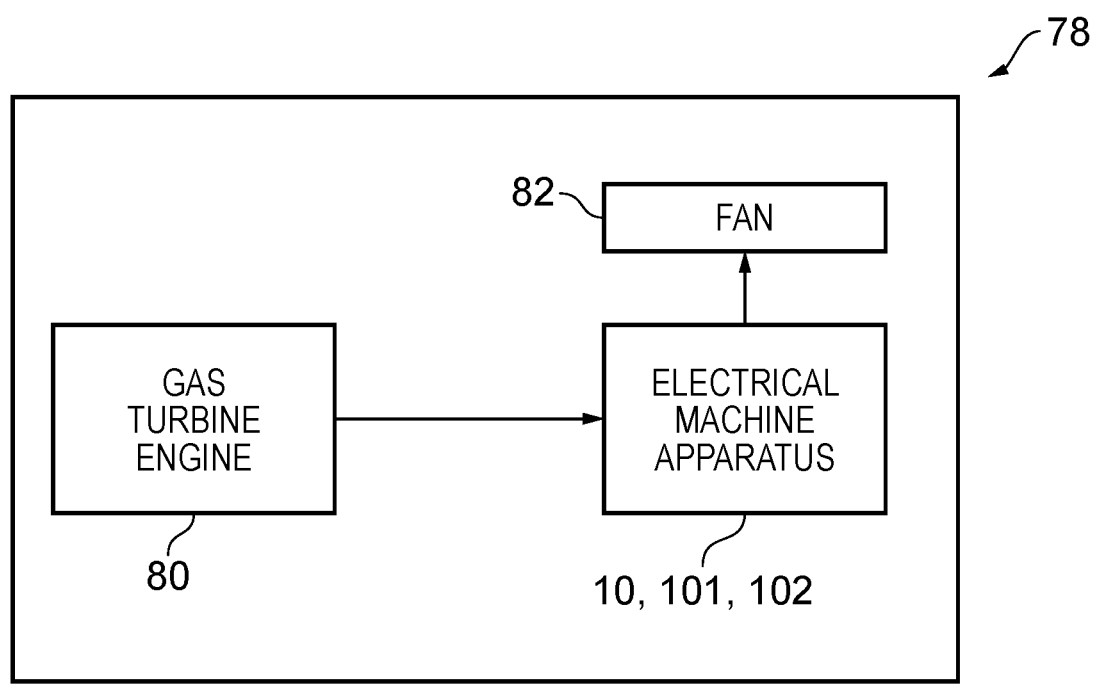
FIG. 5 illustrates a schematic diagram of a propulsion system comprising an electrical machine apparatus according to an example.

FIG. 5 illustrates a schematic diagram of a propulsion system 78 comprising an electrical machine apparatus 10, 101, 102, a gas turbine engine 80, and at least one fan 82. In some examples, the propulsion system 78 may be used on an aircraft to provide thrust.

The gas turbine engine 80 is arranged to generate electrical energy and to provide the generated electrical energy to the electrical machine apparatus 10, 101, 102. In some examples, the gas turbine engine 80 may be the gas turbine engine 66 illustrated in FIG. 4 (that is, the gas turbine engine 80 includes an electrical machine apparatus 10, 101, 102 which functions as an electrical generator). The electrical machine apparatus 10, 101, 102 functions as a motor and rotates the one or more fans 82 to generate thrust.

It will be understood that the disclosure is not limited to the embodiments above-described and various modifications and improvements can be made without departing from the concepts described herein. For example, the conduit 14 illustrated in FIG. 1 may be oriented the same as (or similar to) the conduit 14 illustrated in FIGS. 2A, 2B and 3. In particular, the conduit 14 may be oriented to have a circumferential component that is opposite in direction to the intended rotational direction of the rotor 12.

Except where mutually exclusive, any of the features may be employed separately or in combination with any other features and the disclosure extends to and includes all combinations and sub-combinations of one or more features described herein.

The invention claimed is:

1. Electrical machine apparatus comprising:
   a rotor having an axis of rotation and defining a cavity therein;
   a conduit positioned within the cavity of the rotor, the conduit comprising an inlet arranged to receive a fluid and an outlet arranged to exhaust the fluid, the inlet having a first radial distance from the axis of rotation and the outlet having a second radial distance from the axis of rotation, the first radial distance being greater than the second radial distance; and a further conduit positioned within the cavity of the rotor, the further conduit comprising an inlet arranged to receive a fluid and an outlet arranged to exhaust the fluid, the inlet having a third radial distance from the axis of rotation and the outlet having a fourth radial distance from the axis of rotation, the third radial distance being greater than the fourth radial distance.

2. Electrical machine apparatus as claimed in claim 1, wherein the rotor includes a first portion that extends parallel to the axis of rotation, and the conduit is coupled to the first portion for receiving thermal energy from the first portion via thermal conduction.

3. Electrical machine apparatus as claimed in claim 1, wherein the rotor has a second portion defining a first end of the rotor, and a third portion defining a second end of the rotor, the conduit extending between the first end of the rotor and the second end of the rotor.

4. Electrical machine apparatus as claimed in claim 3, wherein the inlet is positioned adjacent to the first end of the rotor, and the outlet is positioned adjacent to the second end of the rotor.

5. Electrical machine apparatus as claimed in claim 1, wherein the rotor is arranged to rotate in a first circumferential direction, and the conduit has an orientation having a circumferential component, the circumferential component being opposite in direction to the first circumferential direction.

6. Electrical machine apparatus as claimed in claim 1, further comprising a first fluid within the cavity of the rotor, the first fluid having a boiling point that is lower than an operating temperature of the rotor.

7. Electrical machine apparatus as claimed in claim 6, further comprising: a shaft defining a cavity therein; and a second fluid within the cavity of the shaft for cooling the shaft to a temperature below the boiling point of the first fluid.

8. Electrical machine apparatus as claimed in claim 1, wherein the third radial distance is the same as, or different to the first radial distance, and the fourth radial distance is the same as, or different to the second radial distance.

9. Electrical machine apparatus as claimed in claim 1, wherein the conduit is positioned at a first circumferential position within the cavity of the rotor, and the further conduit is positioned at a second circumferential position within the cavity of the rotor, the second circumferential position being different to the first circumferential position.

10. A gas turbine engine comprising the electrical machine apparatus as claimed in claim 1.

11. A propulsion system comprising a gas turbine engine; the electrical machine apparatus as claimed in claim 1; and a propulsive fan arranged to receive torque from the electrical machine apparatus.

* * * * *